(12) United States Patent
Zeidler et al.

(10) Patent No.: US 7,108,123 B2
(45) Date of Patent: Sep. 19, 2006

(54) CONTACT-FREE PLATE CONVEYOR

(75) Inventors: Elmar Zeidler, Sharpsburg, GA (US); Donald T. Vassel, Newnan, GA (US)

(73) Assignee: Grenzebach Maschinenbau GmbH, Agbach-Bäumeunheim (DE)

( * ) Notice: Subject to any disclaimer, the term of this patent is extended or adjusted under 35 U.S.C. 154(b) by 0 days.

(21) Appl. No.: 11/086,790

(22) Filed: Mar. 22, 2005

(65) Prior Publication Data
US 2005/0214078 A1 Sep. 29, 2005

(30) Foreign Application Priority Data
Mar. 26, 2004 (DE) .................. 10 204 014 779

(51) Int. Cl.
*B65G 47/22* (2006.01)
(52) U.S. Cl. .................. 198/493; 65/25.2; 406/88
(58) Field of Classification Search .............. 198/493; 65/182.2, 25.1, 25.2; 406/153, 86, 92, 88
See application file for complete search history.

(56) References Cited

U.S. PATENT DOCUMENTS

| | | | | |
|---|---|---|---|---|
| 2,080,083 A * | 5/1937 | Magnien | ...................... | 65/348 |
| 3,395,943 A * | 8/1968 | Wilde et al. | .................. | 406/88 |
| 3,449,102 A * | 6/1969 | Henri et al. | ................. | 65/25.2 |
| 5,102,118 A * | 4/1992 | Vits | ........................... | 406/88 |
| 5,411,251 A * | 5/1995 | Schmid et al. | ............. | 271/195 |
| 6,315,501 B1 * | 11/2001 | Yagai et al. | ................ | 406/198 |
| 6,336,775 B1 * | 1/2002 | Morita et al. | ................. | 406/88 |
| 6,505,483 B1 * | 1/2003 | Hoetzl et al. | ................ | 65/25.2 |

FOREIGN PATENT DOCUMENTS

| | | |
|---|---|---|
| DE | 1 756 070 | 4/1970 |
| DE | 2 027 823 | 12/1970 |
| DE | 27 54 228 | 7/1978 |
| DE | 24 29 421 | 12/1981 |
| DE | 265 353 | 3/1989 |
| DE | 100 45 479 | 4/2002 |
| WO | WO 03/024877 | 3/2003 |

* cited by examiner

*Primary Examiner*—James R. Bidwell
(74) *Attorney, Agent, or Firm*—Klaus J. Bach

(57) ABSTRACT

In a contact-free plate conveyor including an arrangement of nozzles each having a cup-like shape widening to a planar rim thereof, air under pressure is supplied to the nozzles such that an air flow is generated toward and through a gap formed between the rims of the cups at high speed which generates a vacuum between the cup rims and the plate so as to hold the plate at a predetermined distance from the nozzle arrangement.

7 Claims, 1 Drawing Sheet

CONTACT-FREE PLATE CONVEYOR

BACKGROUND OF THE INVENTION

The invention relates to a contact-free plate conveyor particularly for glass plates.

In the float glass production, the glass web which has been formed and solidified on a liquid metal bath is carried away in a well-known manner by plate conveyors which are generally roller conveyors on which the glass web is moved with its bath side disposed on the rollers. During movement, the finished glass web is cut longitudinally and transversely into glass plates of the desired format and these glass plates are also moved by plate conveyors to stacking station where the plates are removed from the conveyor.

By its contact with the rollers during its movement over the rollers, small traces remain on the support side of the glass. These traces are normally not noticeable but are objectionable for some applications and therefore detrimentally affect the quality of the glass surface.

It is the object of the present invention to provide a conveyor by which such traces inflicted by the mechanical contact between the glass surface and conveyor elements is avoided.

SUMMARY OF THE INVENTION

In a contact-free plate conveyor including an arrangement of nozzles each having a cup-like shape widening to a planar rim thereof, means are provided for supplying air under pressure to the nozzles such that the air flow toward and through a gap formed between the rims of the cups at high speed generates a vacuum between the cup rims and the plate so as to hold the plate at a predetermined distance from the nozzle arrangement.

A publication "Design News" of Aug. 9, 2003, page 90, describes a suction device for holding a plate without directly contacting the plate. This device includes a suction cup in the form of a conical housing with a relatively large cone angle wherein compressed air in the form of an air film is blown in the form of an air film from a correspondingly formed nozzle structure outwardly over the housing surface. This film flowing outwardly over the housing wall forms between the outer circumference of the cup and the surface of an object to be held in a thin fast flowing film which generates in a nozzle gap between the object and the cup circumference a low pressure for holding the object in closely spaced relationship without contacting the object. The suction engagement force is generated by the vacuum generated in the funnel space of the conical cup so that the object can be held by vacuum forces but in spaced relationship from the device generating the vacuum.

The present invention utilizes this principle and further develops it for the construction of a contact-free plate conveyor, wherein glass plates (or other plates) to be transported can be supported at their bottom and also at the top sides thereof and, at the sometime, moved in a contact-free manner.

With the conveyor according to the invention, the plates glide over the suction nozzle matrix of the conveyor which is arranged slightly inclined so that the glass plates slide down the conveyor as they are supported contact-free so that there is essentially no friction. However, the glass plates may also be advanced by the shape of the conical cup that is, instead of being circular conical cups, the cups being in the form of inclined conical cups or having another shape adapted to a particular purpose such that, instead of a circumferentially uniform radial air film wherein the air friction components are balanced, a directional air friction component is generated by the out-flowing air film in the direction of the intended movement of the plate thereby providing the plate advancing force component.

Such a force of the blow nozzles may be provided by a rectangular shape of the nozzle device which is asymmetric in the transport direction having a flat conical web area such that the main air volume flow escapes in the transport direction.

Below, particular embodiments of the invention will be described in greater detail on the basis of the accompanying drawings:

DESCRIPTION OF THE VARIOUS EMBODIMENTS

Figure 1:
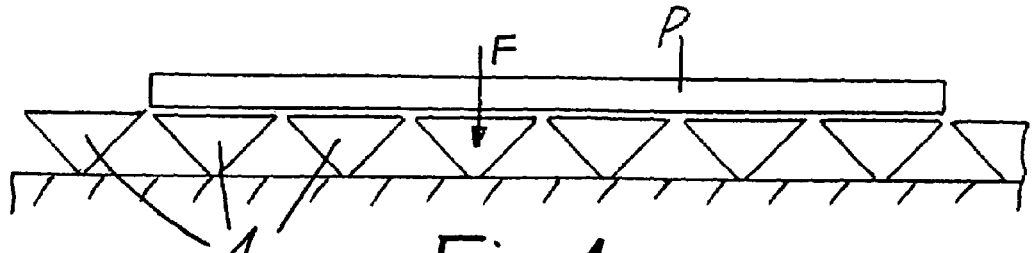
FIG. 1 is a schematic side view showing the design concept for a web or plate conveyor according to the invention.
Figure 2:
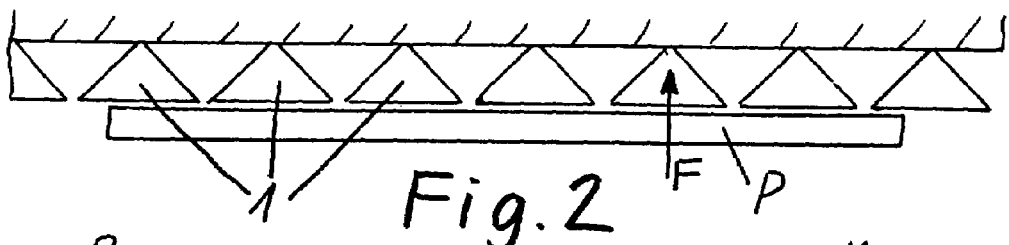
FIG. 2 shows a plate conveyor similar to that shown in FIG. 1, however with the plates suspended from the conveyor.

FIGS. 1 and 2 are schematic side views of the design structure for explaining the concept on which the present invention is based. The plate conveyor according to the invention comprises a matrix-like arrangement of suction nozzles 1 for moving glass plates or other plates which are either disposed on top of the nozzle 1 (FIG. 1) or are suspended below these nozzles without being in contact with the nozzles 1. The suction nozzle matrix comprises a multitude of suction nozzles 1 to which air under pressure is supplied and which are arranged in an expedient array distributed over the width and the length of the conveyor. Expediently, the suction nozzle matrix may comprise several parallel strip-like arrangements of nozzles and divided into fields which cover only a part of the width of the conveyor, and to which air under pressure is separately supplied so that the conveyor can be operated efficiently also in connection with plates which have a smaller width than the conveyor.

Figures 3, 4:
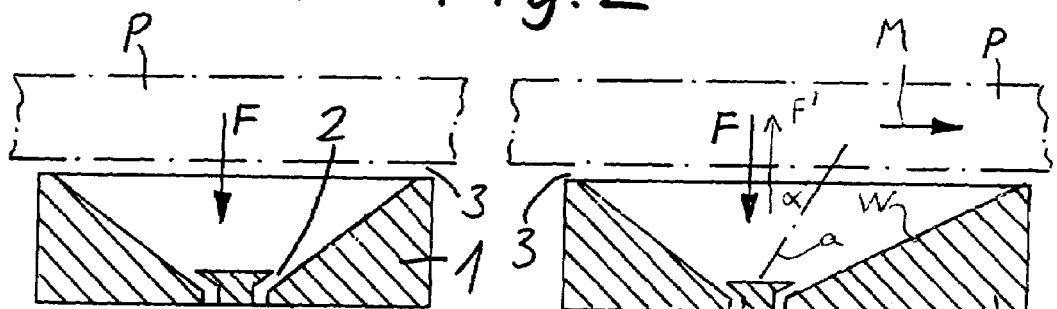
FIG. 3 shows in cross-section a suction nozzle of the plate conveyor, FIG. 4 show in cross-section a modified suction nozzle for generating a directional force component for moving the plate.

FIG. 3 shows schematically in cross-section, a suction nozzle 1. It is conical cup-shaped in the shape of a centric circular cone with a large cone angle. Through an annular inlet nozzle structure 2 in the apex area of the suction nozzle 1 pressurized air is blown into the cone so as to form an air film which flows along the inner cone wall. The pressurized air leaves the conical cup in the form of a thin air film via a thin gap outlet nozzle structure 3 between the circumferential edge of the suction nozzle 1 and the plate P flowing at relatively high speed whereby a low pressure is generated along the edge of the conical cup providing for a suction force F which is effective on the plate in direction toward the suction nozzle 1.

On the other hand, the air pressure present in the cup provides a force F' on the plate away from the nozzle 1. If the plate comes too close to the nozzle, the force F' exceeds the force F and the plate is moved away from the suction nozzle 1. When the plate P moves away from the nozzle 1, the air flow through the circumferential gap increases, the pressure in the cup is reduced and the air flow through the gap between the circumferential nozzle edge and the plate is increased so that also the vacuum generated thereby is increased and the force F exceeds again the force F'. At an equilibrium, a certain gap is maintained that is the plate is supported at a certain distance from the nozzle 1.

FIG. 4 shows a suction nozzle 1 in cross-section similar to that of FIG. 3 wherein however the suction nozzle has a shape which is modified in such a way that, instead of being circular, the cup is defined by an inclined cone. The center axis a of this inclined cone defines with the surface of the plate P to be moved on acute angle α which points into the travel direction of the plate P on the conveyor. The air flowing from the inlet nozzle 1 to the outlet gap is therefore in contact with the plate over a greater area than in the opposite direction so that the air friction forces on the plate in the travel direction exceed those in the opposite direction and the plate is moved or floated along the conveyor at a predetermined distance from the nozzles 1.

FIG. 4 shows a suction nozzle 1 in cross-section similar to that of FIG. 3 wherein however the suction nozzle has a shape which is modified in such a way that, instead of being circular, the cup is defined by an inclined cone. The center axis a of this inclined cone defines with the surface of the plate P to be moved on acute angle α which points into the travel direction of the plate P on the conveyor. The air flowing from the inlet nozzle 1 to the outlet gap is therefore in contact with the plate over a greater area than in the opposite direction so that the air friction forces on the plate in the travel direction exceed those in the opposite direction and the plate is moved or floated along the conveyor at a predetermined distance from the nozzles 1.

Figure 5A:
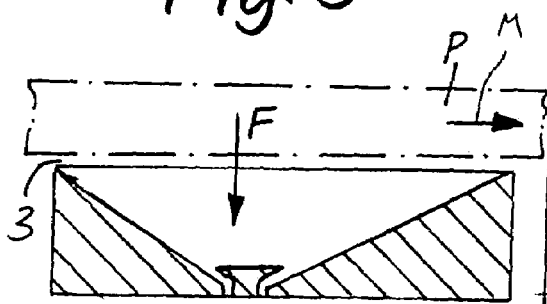
FIGS. 5A and 5B are schematic cross-sectional and top views of a further modified support nozzle for generating a directional force component for moving the plate.
Figure 5B:
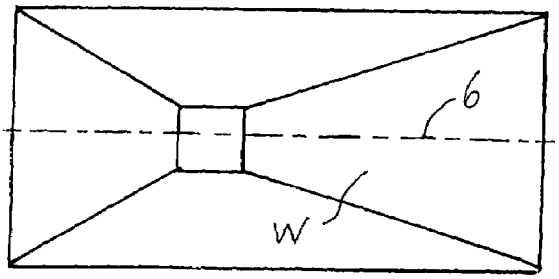

As shown in FIGS. 5A and 5B, the nozzle 1 is modified in its shape that is, it has a rectangular shape. The movement force M is provided in the same way as explained in connection with FIG. 4. The longitudinal axis b of the oblong cross-section extends parallel to the transport direction M of the pate P.

What is claimed is:

1. A contact-free plate conveyor comprising an areal arrangement of suction nozzles (1) each having a conical cup-like shape widening from an apex toward a planar rim thereof forming with a plate (P) an outlet nozzle structure (3) and means supplying air under pressure via an inlet nozzle structure (2) disposed at the apex to the interior of the suction nozzles in the areal nozzle arrangement such that the air flows toward and through the thin gap outlet nozzle structure (3) formed between the planar rim of the cup and the plate (P) at high speed in a direction parallel to the plate supported on the conveyor whereby a vacuum is generated between the rim area of the cups and the plate (P) thereby holding the plate at a predetermined distance from the nozzle arrangement against a pressure generated within the nozzle cups by the air supplied thereto.

2. A contact-free plate conveyor according to claim 1, wherein the nozzle cup has the shape of a cone which is inclined so that its axis includes a pointed angle (α) with an adjacent surface of the plate (P) to be moved on the conveyor.

3. A contact-free plate conveyor according to claim 1, wherein the nozzle cup (1) has the shape of a rectangular cone whose axis is inclined so that it includes a pointed angle (α) with the surface of the plate (P).

4. A contact-free plate conveyor according to claim 2, wherein the nozzle cup (1) has an oblong cross-section with a longitudinal axis (6) of the oblong cross-section extending parallel to the transport direction of the plates (P) on the conveyor and the nozzle cup (1) having a wall extending in the travel direction and inclined at an essentially smaller angle of inclination than the other cup walls.

5. A contact-free plate conveyor according to claim 1, wherein the nozzles have their apexes at the bottom and the rim areas at the top and the plates are supported on top of the nozzles.

6. A contact-free plate conveyor according to claim 1, wherein the nozzle rims are disposed at the bottom of the nozzle and the plates are suspended below the nozzles supported by the vacuum generated between the rim of the nozzles and the plate (P).

7. A contact-free plate conveyor according to claim 1, wherein the nozzle rim forms a nozzle outlet and is slightly inclined in the travel direction.

\* \* \* \* \*